(12) United States Patent
Hoyashita

(10) Patent No.: US 6,315,646 B1
(45) Date of Patent: Nov. 13, 2001

(54) PROCESSING SYSTEM FOR INCREASING THE QUALITY OF A GEAR AND A BARRELING APPARATUS USABLE IN THE SAME

(75) Inventor: Shigeru Hoyashita, Saga (JP)

(73) Assignee: Saga University, Saga (JP)

( * ) Notice: Subject to any disclaimer, the term of this patent is extended or adjusted under 35 U.S.C. 154(b) by 0 days.

(21) Appl. No.: 09/419,866

(22) Filed: Oct. 19, 1999

(30) Foreign Application Priority Data

Oct. 23, 1998 (JP) .................................................. 10-301856

(51) Int. Cl.⁷ ...................................................... B24B 1/00
(52) U.S. Cl. ................................ 451/65; 451/66; 451/73; 451/57; 451/58; 451/37; 72/53; 29/90.7
(58) Field of Search .................................. 72/53; 29/90.7, 29/893, 57, 65; 451/68, 73, 66, 461, 327, 34, 113, 35, 332, 333, 339, 85, 104, 60, 80, 114

(56) References Cited

U.S. PATENT DOCUMENTS

| | | | |
|---|---|---|---|
| 4,604,881 | * | 8/1986 | Lienert ..................................... 72/53 |
| 4,730,417 | * | 3/1988 | Davidson et al. .................... 451/113 |
| 5,690,538 | * | 11/1997 | Haas ....................................... 451/32 |
| 5,722,165 | * | 3/1998 | Kobayashi et al. ............. 29/894.325 |
| 5,911,780 | * | 6/1999 | Hamasaka et al. ....................... 72/53 |
| 6,027,577 | * | 2/2000 | Mikura et al. ........................ 148/226 |
| 6,058,584 | * | 5/2000 | Maysuyama et al. ................ 29/90.7 |
| 6,120,358 | * | 9/2000 | Porter ..................................... 451/57 |

FOREIGN PATENT DOCUMENTS 6-114640   4/1994 (JP) .
6-246548   9/1994 (JP) .
9-070748   3/1997 (JP) .

* cited by examiner

*Primary Examiner*—Derris H. Banks
*Assistant Examiner*—G. Nguyen
(74) *Attorney, Agent, or Firm*—Venable; Robert J. Frank

(57) ABSTRACT

A processing system for increasing the quality of a gear having a shot peening apparatus for subjecting, to shot peening, a gear after tooth-forming and surface hardening; a barreling apparatus positioned adjacently to the shot peening apparatus, for subjecting, to barreling, the gear which has been subject to shot peening by the shot peening apparatus; and a gear feeding apparatus positioned adjacently to the shot peening apparatus and the barreling apparatus, for feeding, to the barreling apparatus, the gear which has been subjected to the shot peening by the shot peening apparatus. Thus, a gear of high quality can be efficiently produced, and the working environment can be cleaned at low cost by a dust collecting apparatus.

17 Claims, 4 Drawing Sheets

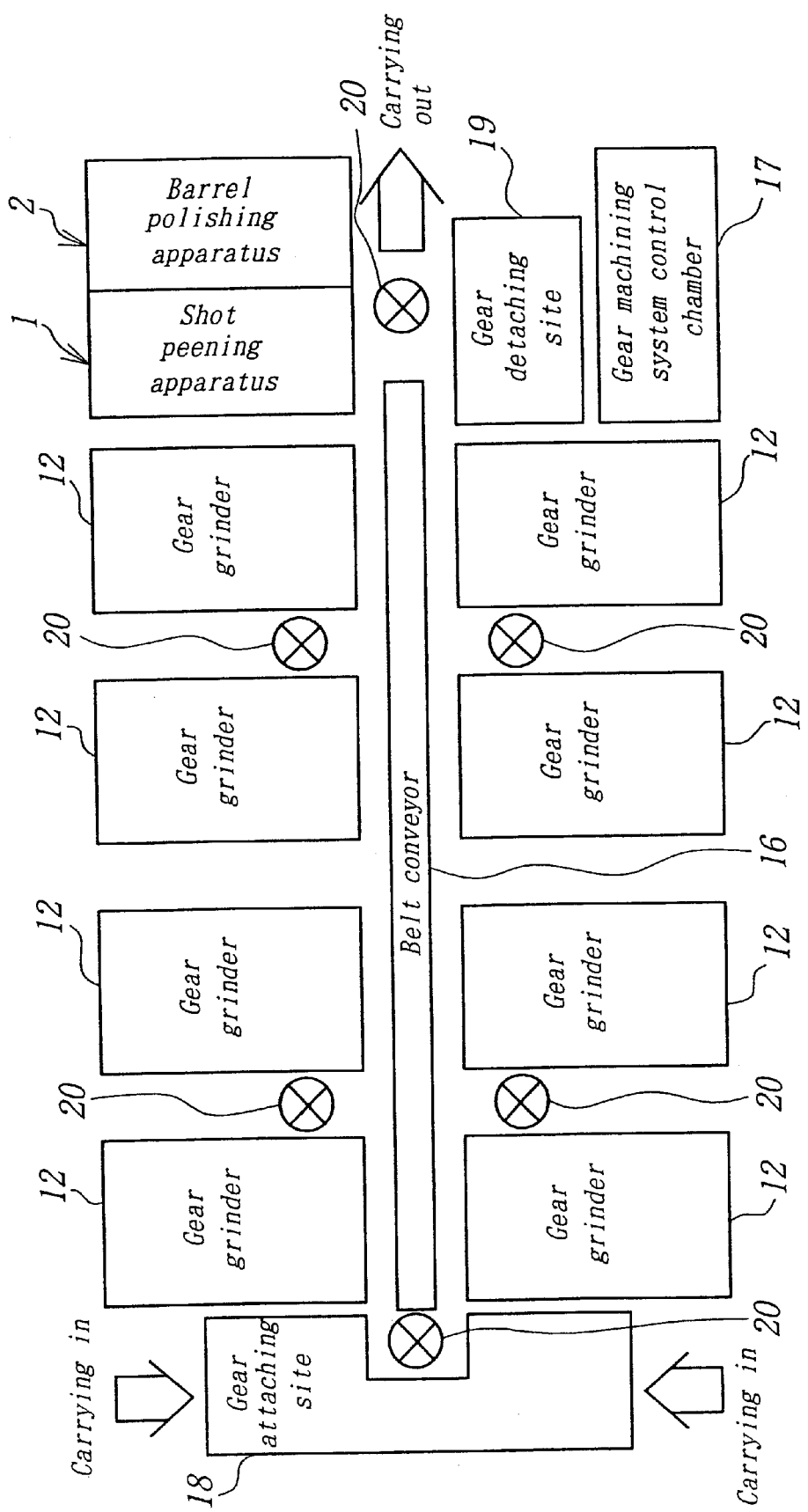

PROCESSING SYSTEM FOR INCREASING THE QUALITY OF A GEAR AND A BARRELING APPARATUS USABLE IN THE SAME

BACKGROUND OF THE INVENTION

1. Field of the Invention

The present invention relates to a processing system for increasing the quality of a gear, which can efficiently and economically produce a gear of high quality by sequentially subjecting a gear to shot peening and barreling after tooth-forming by hobbing, shaving or rolling and surface hardening such as heat treatment, carburizing or nitriding, or gear surface grinding, so as to enhance dedendum bending fatigue strength, surface durability and abrasion resistance, thereby increasing load capacity.

The present invention can be applicable to any of various gears fabricated in the conventional processes (for example, a spur gear, a helical gear, a double helical gear, a crossed helical gear, a worm gear and the like), and further, is applicable not only to a normal involute form, but also arbitrary tooth forms (for example, a cycloidal curve, a trochoidal curve, a circular arc and the like).

2. Description of the Related Art

A conventional basic series of processes of fabricating a steel gear, which has been subjected to surface hardening such as carburization hardening, includes three kinds of typical processes described below. Here, there will be omitted shot blasting for the purpose of scaling or deburring after the surface hardening or center hole grinding for the purpose of fixing the gear to a shaft.

(1) Hobbing→surface hardening (2) Hobbing→shaving or rolling→surface hardening (3) Hobbing→surface hardening→tooth surface grinding The series (1) of processes, in which a tooth surface is finished only by hobbing, is used in fabricating a relatively large gear for, e.g., a water gate. The series (2) of processes is used in fabricating a small- or middle-sized gear, which is usually used in a transmission for an automobile. The series (3) of processes is used in fabricating a gear for use in a transmission for a prestige car or a speed changer for general industrial machinery.

Nowadays, after the series (2) or (3) of processes, shot peening may be additionally performed for the purpose of enhancement of dedendum bending fatigue strength of the gear. However, if a dedendum is subjected to shot peening, a tooth surface for power transmission becomes rough, thereby arising a problem from the viewpoint of surface durability.

The inventor of the present invention has found that barreling after shot peening can remarkably improve surface durability. In view of this finding, the inventor has devised a basic series of processes as follows:

(4) Hobbing→shaving or rolling→surface hardening→shot peening→barreling (5) Hobbing→surface hardening→tooth surface grinding→shot→peening→barreling However, in the series (4) of processes, the shot peening and the barreling are generally performed independently of each other, thereby arising a problem that efficient production cannot be achieved. Moreover, also in the series (5) of processes, the tooth surface grinding, the shot peening and the barreling are generally performed independently of each other, thereby arising the problem that efficient production cannot be achieved. Furthermore, both a shot peening apparatus and a barreling apparatus are relatively liable to induce environmental pollution, thus arising a problem of an increase in cost of cleaning of working environment by means of a dust collecting apparatus or the like.

SUMMARY OF THE INVENTION

The present invention has been accomplished in an attempt to solve the above problems observed in the related art. An object of the present invention is to take the processes of shot peening and barreling into one and the same system so as to perform the processes in sequence, thus achieving efficient production. Furthermore, it is another object of the present invention to take tooth surface grinding into one and the same system so as to achieve more efficient production. Additionally, it is a further object of the present invention to reduced the cost of cleaning the working environment. Furthermore, it is still further object of the present invention to provide a barreling apparatus which can be used in the system.

According to the present invention, there is provided a processing system for increasing the quality of a gear in which the above-described problems can be advantageously solved. A processing system for increasing the quality of a gear, after tooth forming and surface hardening, comprises: a shot peening apparatus for subjecting, to shot peening, a gear after tooth forming and surface hardening; a barreling apparatus positioned adjacently to the shot peening apparatus, for subjecting, to barreling, the gear which has been subjected to the shot peening by the shot peening apparatus; and a gear feeding apparatus positioned adjacently to the shot peening apparatus and the barreling apparatus for feeding, to the barreling apparatus, the gear which has been subjected to the shot peening by the shot peening apparatus.

In this system, when a workpiece comprising a jig detachably supporting one or a plurality of gears is, after tooth-forming and surface hardening, fed to the shot peening apparatus, the jig rotates the gear while it is shot peened so as to improve the dedendum bending fatigue strength of the gear. Subsequently, the gear feeding apparatus positioned adjacent both shot peening apparatus and the barreling apparatus feeds the jig and detachably supported gear, which gear has been subjected to shot peening by the shot peening apparatus, to the barreling apparatus, which then subjects the fed gear to barreling by rotating the jig and supported gear inside a revolving barrel tank.

Consequently, according to the system, the shot peening and barreling processes take place in one and the same system, the gear feeding apparatus moving the jig and gear from the shot peening apparatus to the barreling apparatus so that a gear of high quality can be efficiently produced. Furthermore, since both the shot peening apparatus and the barreling apparatus, both of which are relatively liable to induce environmental pollution, are integrated with each other, the number of cleaning facilities such as dust collecting apparatus can be reduced, thus achieving inexpensive cleaning of the working environment.

In a processing system for increasing the quality of a gear according to the present invention, the gear feeding apparatus may feed the jig supporting detachably the gear to the shot peening apparatus and may take the jig supporting detachably the gear out of the barreling apparatus. According to the system, the gear can be automatically fed to or taken out of the system, thus efficiently producing a gear of high quality.

Furthermore, in a processing system for increasing the quality of a gear according to the present invention, the shot peening apparatus and the barreling apparatus may be positioned laterally with respect to each other. According to the system, the feeding distance of the gear can be reduced, thus simplifying the configuration of the gear feeding apparatus.

Meanwhile, in a processing system for increasing the quality of a gear according to the present invention, the shot peening apparatus and the barreling apparatus may be positioned vertically with respect to each other. According to the system, the floor area occupied by the system can thereby be reduced, thus enhancing the space efficiency of the gear production site.

Moreover, a processing system for increasing the quality of a gear according to the present invention may further comprise: a grinding apparatus positioned adjacently to the shot peening apparatus, for grinding the tooth surface of the gear; and a second gear feeding apparatus positioned adjacently to the grinding apparatus and the shot peering apparatus, for feeding, to the shot peening apparatus, the gear whose tooth surface has been ground by the grinding apparatus. According to the system, the gear surface grinding before the shot peening can be taken into one and the same system so as to be performed in sequence, thus more efficiently producing a gear of high quality.

Additionally, in a processing system for increasing the quality of a gear according to the present invention, the barreling apparatus may be of the gyro type in which a barrel tank is revolved and the gear is rotated inside the barrel tank, the barreling apparatus comprising: medium supplying means for supplying a plurality of kinds of media to the barrel tank in sequence; and medium discharging means for discharging, from the barrel tank, the media with which the gear has been subjected to the barreling. According to the system, the barrel tank revolves and the gear rotates inside the barrel tank. The medium supplying means supplies a plurality of kinds of media (abrasive stone) to the barrel tank in sequence. Upon completion of the gear barreling, the medium discharging means discharges the media from the barrel tank. Consequently, according to the system, the barreling can be performed with various media thus more efficiently producing a gear of high quality.

A barreling apparatus according to the present invention, which can be used in the above-described system, is of the gyro type which revolves a barrel tank and rotates a workpiece inside the barrel tank, a barreling apparatus of the gyro type comprising: medium supplying means for supplying a plurality of kinds of media to the barrel tank in sequence; and media discharging means for discharging, from the barrel tank, the media with which the workpiece has been subjected to barreling. According to the barreling apparatus, the barrel tank revolves and the workpiece including a gear rotates inside the barrel tank. The medium supplying means supplies the plurality of kinds of media to the barrel tank in sequence. Meanwhile, the medium discharging means discharges the media after barreling of the workpiece in the barrel tank as been completed. Consequently, the barreling apparatus can be used in the above-described system, so that gear barreling can be performed without the gears being damaged by striking other gears in the barrel tank. Furthermore, the barreling apparatus can be applicable to devices other than gears.

In the barreling apparatus according to the present invention, the plurality of kinds of media may be two kinds of media: a roughing medium and a finishing medium having an abrasive grain finer than that of the roughing medium. According to the barreling apparatus, the roughing and the finishing can be sequentially preformed in the barreling, thus performing efficient barreling in a short time.

In the meantime, in the barreling apparatus according to the present invention, a plurality of kinds of media may be two kinds of media: a fine portion barreling medium capable of entering a fine portion of a gear and a peripheral portion barreling medium greater than the fine portion barreling medium. According to the barreling apparatus, the times for barreling the fine portion and peripheral portion of the workpiece can be set independently of each other, thus performing desired barreling suitable for the fine portion and peripheral portion of the gear.

BRIEF DESCRIPTION OF THE DRAWINGS

FIG. 3 is a plan view showing the schematic configuration of a third preferred embodiment of a processing system for increasing the quality of a gear according to the present invention;

DETAILED DESCRIPTION OF THE PREFERRED EMBODIMENTS

Preferred embodiments according to the present invention will be described below in reference to the accompanying drawings.

First Embodiment

Figure 1A:
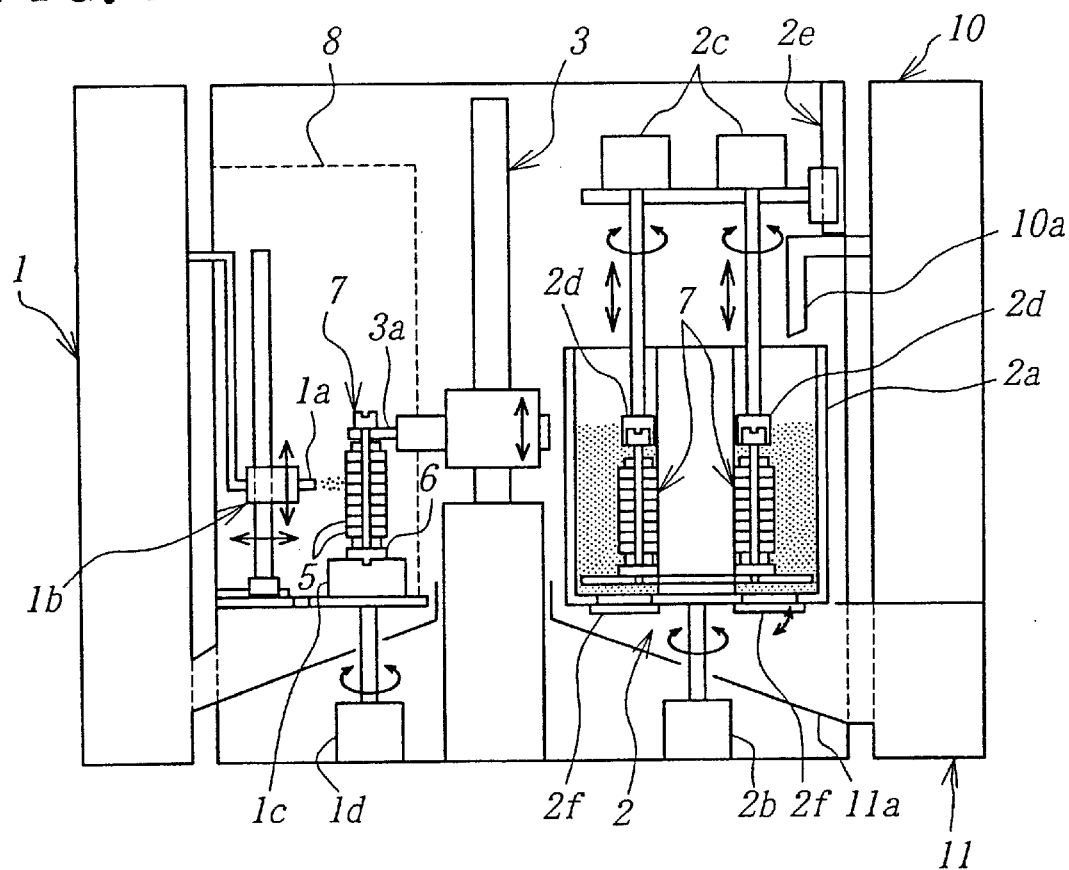
FIG. 1A is a vertical cross-sectional view showing the schematic configuration of a first preferred embodiment of a processing system for increasing the quality of a gear according to the present invention.
Figure 1B:
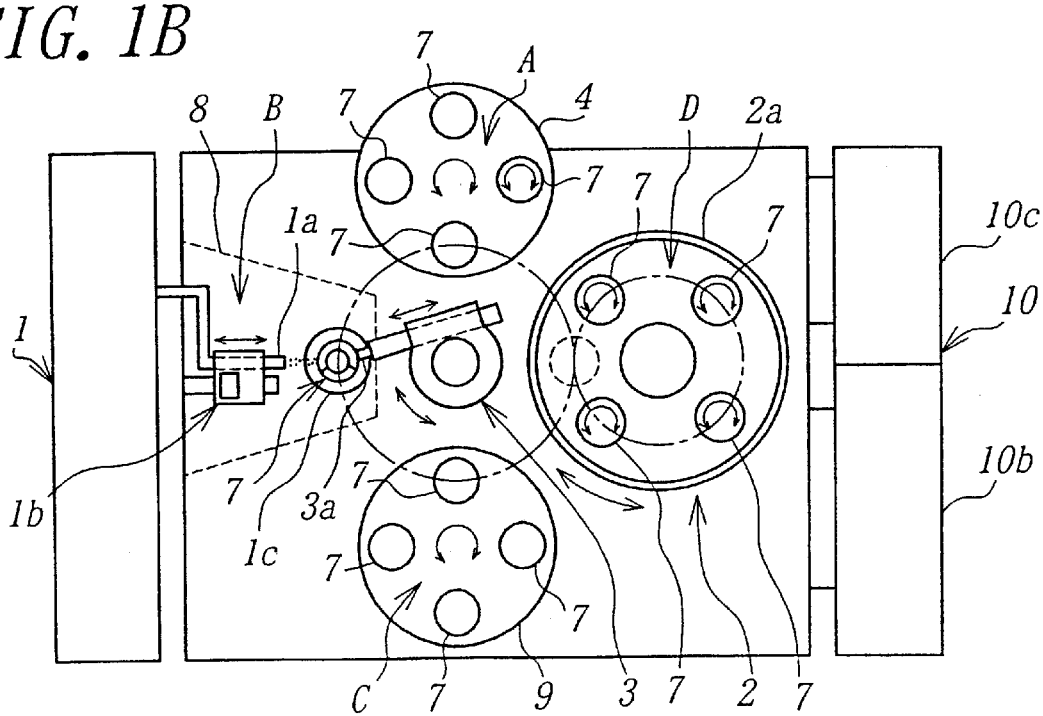
FIG. 1B is a plan view showing the schematic configuration of the system of the first preferred embodiment.

FIG. 1A is a vertical cross-sectional view showing the schematic configuration of a first preferred embodiment of a processing system for increasing the quality of a gear or gears according to the present invention; and FIG. 1B is a plan view showing the schematic configuration of the system of the first preferred embodiment. This system in the first embodiment comprises: a shot peening apparatus 1; a gyro type barrel polishing apparatus 2 disposed laterally adjacently to the shot peening apparatus 1; and a polar coordinates industrial robot 3 serving as a gear feeding apparatus disposed adjacently to and between the shot peening apparatus 1 and the barrel polishing apparatus 2.

With respect to a gear having a module of 3, a number of teeth equal to 30 and a gear width of 20 mm, it normally takes 30 seconds to several minutes for shot peening and a few to 60 minutes for barreling. In consideration of these required processing times, the system in this embodiment is provided with four sections A, B, C and D around the polar coordinates robot 3 having an arm 3a capable of expanding, contracting, elevating, descending and rotating, Here, in the section A are disposed a pallet 4 of a turn table type, a not-shown cleaning device and a not-shown shield of an opening/closing type for covering the pallet 4. In the section B, there are provided a shot nozzle 1a, a nozzle moving mechanism 1b for elevating, descending, advancing, retreating, swinging and oscillating the shot nozzle 1a, a workpiece table 1c for detachably attaching a workpiece unit 7 consisting of one or a plurality of gears 5 and a jig 6 for detachably supporting the gears 5, in the attitude in which the central axis of the workpiece unit extends vertically, a motor 1d for rotating the workpiece table 1c of the shot peening apparatus 1; and a shield 8 of an opening/closing type for covering them.

In the section C is disposed another pallet 9 of a turn table type identical to that in the section A. In the section D, there are provided, in the barrel polishing apparatus 2, a barrel tank 2a, a motor 2b for revolving the barrel tank 2a, motors 2c for rotating the workpiece units 7 at four points in the circumferential direction inside the barrel tank 2a, chucks 2d for detachably connecting the workpiece units 7 to the motors 2c, respectively, and a workpiece elevating/descending mechanism 2e for elevating/descending the motors 2c so as to elevate/descend the workpiece units 7 with respect to the barrel tank 2a; a not-shown bottom cover opening/closing mechanism for opening/closing bottom covers 2f of the barrel tank 2a; a medium supplying duct 10a and a medium recovering duct 11a extending, respectively, from a medium supplying apparatus 10 and a medium recovering tank 11 disposed adjacently to the section D; and a not-shown compound supplying mechanism for supplying a compound into the barrel tank 2a together with water.

The medium supplying apparatus 10 has a roughing medium reservoir 10b for reserving a roughing medium (abrasive stone) which is made by solidifying relatively rough abrasive grains, and a finishing medium reservoir 10c for reserving a finishing medium which is made by solidifying abrasive grains finer than those of the roughing medium. The medium supplying duct 10a selectively supplies the above-described two kinds of media from the two medium reservoirs 10b and 10c into the barrel tank 2a.

In this system, the gear or gears 5 are subjected to shot peening and barrel polishing in sequence in the following series of processes:

(1) First, one or a plurality of gears 5, in which a tooth form including a tooth surface is formed with high precision by hobbing and shaving or rolling, followed by surface hardening such as heat treatment, are fixed to the jig 6, thereby constituting each of the workpiece units 7. The workpiece unit 7 is automatically or manually carried to the section A, to be placed on the pallet 4.

(2) Subsequently, the pallet 4 is rotated, so that a workpiece unit 7 ius moved within a movable range of the arm 3a of the robot 3. The robot 3 moves a workpiece unit 7 from the section A to the section B by movement of the arm 3a, and then places it on the workpiece table 1c of the shot peening apparatus 1. Thus, a workpiece unit 7 is fixed onto the workpiece table 1c.

(3) Next, in the section B, the gears 5 mounted on the workpiece unit 7 are subjected to shot peening for a predetermined time. While the shot nozzle 1a is elevated, descended, advanced, retreated, swung or oscillated by the nozzle moving mechanism 1b, shot balls are blown onto the gears 5 from the shot nozzle 1a. Meanwhile, the work piece unit 7 is rotated forward or reversely with respect to a predetermined rotating direction via the workpiece table 1c b the motor 1d, such that the shot balls can uniformly strike against both tooth surfaces of the gears 5. During the shot peening, the shield 8 is closed in order to prevent the shot balls from flying our of the section B.

(4) Thereafter, the robot 3 places the workpiece unit 7 on the pallet 9 in the section C by movement of the arm 3a. The workpiece unit 7 waits its next barreling turn on the pallet 9.

(5) Subsequently, one or several workpiece units 7 are moved in sequence to the section D by the arm 3a of the robot 3, and then, are fed above the barrel tank 2a from which media have been removed previously. Each workpiece unit 7 is held by a chuck 2d elevated together with the motor 2c by the workpiece elevating/descending mechanism 2e, and then is lowered into the inside of the barrel tank 2a by the workpiece elevating/descending mechanism 2e.

(6) Next, the gears 5 mounted on the workpiece units 7 are subjected to barrel polishing inside the barrel tank 2a. At this moment, after the bottom cover 2f of the barrel tank 2a is first closed by the bottom cover opening/closing mechanism, the roughing medium is supplied into the barrel tank 2a from the roughing medium reservoir 10b via the medium supplying duct 10a while the compound is supplied into the barrel tank 2a from the compound supplying mechanism. Next, the barrel tank 2a is rotated (revolved) forward and reversely with respect to the predetermined rotating direction by the motor 2b, and further, the workpiece units 7 are rotated reversely with respect to the rotating direction of the barrel tank 2a at the four points in the circumferential direction inside the barrel tank 2a by the motors 2c. Consequently, the tooth surfaces of the gears 5 are subjected to the rough barrel polishing with the roughing medium and the compound. During the barrel polishing, for example, vibration in a vertical direction (i.e., in a direction of the center axis of the gear) may be applied to the workpiece units 7 by the workpiece elevating/descending mechanism 2e.

Upon completion of the rough barrel polishing, the bottom covers 2f of the barrel tank 2a are opened by the bottom cover opening/closing mechanism, so that the roughing medium and the compound inside the barrel tank 2a are recovered into the medium recovering tank 11 via the medium recovering duct 11a. Next, after the bottom covers 2f of the barrel tank 2a are closed by the bottom cover opening/closing mechanism, the finishing medium is supplied to the barrel tank 2a from the finishing medium reservoir 10c via the medium supplying duct 10a, and further, the compound is supplied to the barrel tank 2a from the compound supplying mechanism. In the same manner as the above-described rough barrel polishing, the tooth surfaces of the gears 5 are subjected to the finishing barrel polishing with the finishing medium and the compound. Upon completion of the finishing barrel polishing, the bottom covers 2f of the barrel tank 2a are opened by the bottom cover opening/closing mechanism, so that the finishing medium and the compound staying inside the barrel tank 2a are recovered into the medium recovering tank 11 via the medium recovering duct 11a.

During either one process of the rough barrel polishing and the finishing barrel polishing, the medium for the other process is returned to the medium reservoir. At this moment, the deteriorated state of the media and the compound is checked successively, and then, the media may be replaced with new ones, as required. Consequently, the barrel polishing apparatus 2 is remarkably suitable for sequentially machining the gears 5 in large or medium quantities.

(7) Subsequently, each workpiece unit 7 is elevated from the inside of the barrel tank 2a by the workpiece elevating/descending mechanism 2e, and then moved onto the pallet 4 in the section A by the arm 3a of the robot 3. In the section A, after the shield is closed, air and a cleaning solvent are blown onto the workpiece unit 7 in order to wash out a machining liquid mixture of the compound with water, and further, a corrosion inhibitor is atomized, as necessary.

(8) Thereafter, the shield is opened, and then the workpiece unit 7 is automatically or manually carried out of the section A.

Consequently, according to the system in the first embodiment, since the shot peening and the barreling are taken into one and the same system so as to be performed in sequence, gears of high quality can be produced efficiently. Further, since the shot peening apparatus and the barreling apparatus, both of which are relatively liable to induce environmental pollution, are integrated with each other, it is possible to reduce the number of cleaning facilities such as dust collecting apparatus, thereby achieving inexpensive cleaning of the working environment.

Moreover, according to the system in the first embodiment, since the robot 3 automatically feeds the workpiece units 7 to the shot peening apparatus 1 and takes it, including the jig and gears 5 out of the barrel polishing apparatus 2, gears of high quality can be produced efficiently.

Additionally, according to the system in the first embodiment, since the shot peening apparatus 1 and the barrel polishing apparatus 2 are arranged laterally with respect to each other, it is possible to reduce the gear feeding distances thus simplifying the configuration of the robot 3.

Second Embodiment

Figure 2:
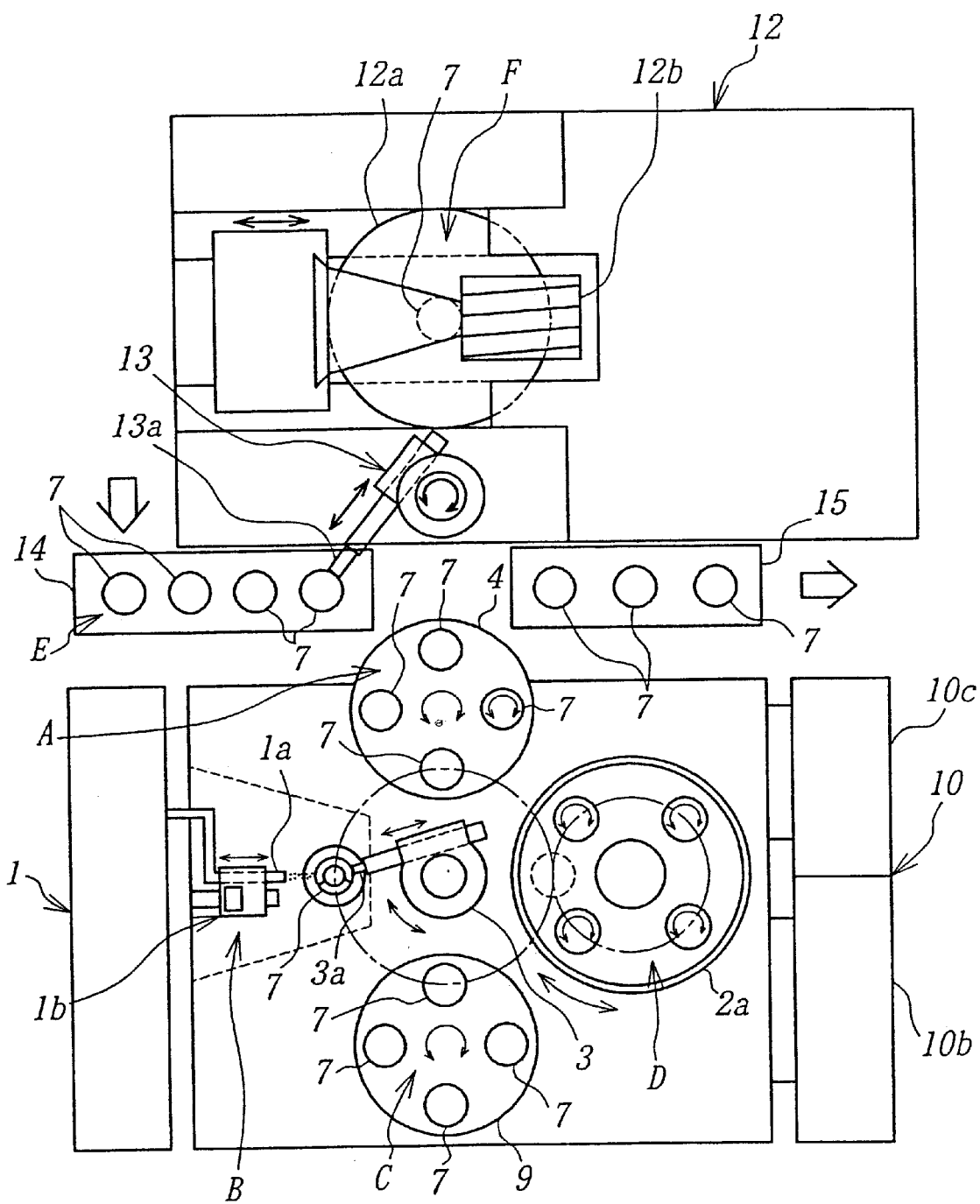
FIG. 2 is a plan view showing the schematic configuration of a second preferred embodiment of a processing system for increasing the quality of a gear according to the present invention.

FIG. 2 is a plan view showing the schematic configuration of a gear machining system as a second preferred embodiment of a processing system for increasing the quality of a gear or gears according to the present invention. The system in this embodiment comprises: a shot peening apparatus 1; a gyro type barrel polishing apparatus 2 disposed laterally adjacently to the shot peening apparatus 1; and a polar coordinates industrial robot 3 as a gear feeding apparatus installed adjacently to and between the shot peening apparatus 1 and the barrel polishing apparatus 2. In addition, the system in this embodiment further comprises: an NC (numerical control) gear grinder 12 as a grinding apparatus disposed laterally adjacently to the shot peening apparatus 1; a second robot 13 having the same configuration as that of the robot 3, serving as a second gear feeding apparatus disposed adjacently to the shot peening apparatus 1 and the gear grinder 12; and a pair of belt conveyors 14 and 15 for carrying workpiece units 7 in or out of the system. The configurations and arrangements of the shot peening apparatus 1, the barrel polishing apparatus 2 and the robot 3 are identical to those in the first embodiment described above, and therefore, their detailed descriptions will be omitted here.

The system in the second embodiment includes a section E in which the belt conveyors 14 and 15 are positioned and a second F in which a workpiece table 12a of the gear grinder 12 is located, in addition to four sections A, B, C and D.

In the system in this embodiment, the gear or gears 5 (See FIG. 1A) are subjected to shot peening and barrel polishing in sequence in the following series of processes:

(1) First, one or a plurality of gears 5, in which a tooth form is shaped with a certain degree of precision by hobing or the like, followed by surface hardening such as heat treatment, are fixed to the jig 6 (FIG. 1A), thereby constituting each of the workpiece units 7. The workpiece unit or units 7 are automatically or manually carried to the section E, to be placed on the belt conveyor 14.

(2) Subsequently, the belt conveyor 14 is operated so that the workpiece units 7 mounted on the belt conveyor 14 are moved one by one within a movable range of the arm 13a of the robot 13. The robot 13 moves each workpiece unit 7 from the section E to the section F by means the arm 13a, and then, places it on the workpiece table 12a of the gear grinder 12. Consequently, the workpiece unit 7 is fixed onto the workpiece table 12a. The tooth surfaces of the gears 5 in the workpiece unit 7 are ground by a grindstone 12b of the gear grinder 12.

(3) Upon completion of grinding, the workpiece unit 7 is moved from the section F to the section A by the arm 13a of the robot 13, and then, is placed on a pallet 4.

The processes onwards are identical to those in the first embodiment:

(4) The workpiece unit 7 is moved to the section B by an arm 3a of a robot 3.

(5) Next, the tooth surfaces of the gears 5 in the workpiece unit 7 are subjected to shot peening by the shot peening apparatus 1.

(6) The workpiece unit 7 is fed onto a pallet 9 in the section C by the arm 3a of the robot 3, and then, waits its turn for barreling.

(7) The workpiece unit 7 is moved to a barrel tank 2a in the section D by the arm 3a of the robot 3.

(8) The tooth surfaces of the gears 5 in the workpiece unit 7 are subjected to barrel polishing by the barrel polishing apparatus 2.

(9) The workpiece unit 7 is fed to the section A by the arm 3a of the robot 3, wherein the gears 5 are cleaned. A corrosion inhibitor may be atomized to the gears 5, as required.

(10) Thereafter, the workpiece unit 7 is moved from the pallet 4 in the section A onto the belt conveyor 15 in the section E by the arm 3a of the robot 3. The belt conveyor 15 is operated to sequentially carry the workpiece units 7 mounted thereon. Finally, the workpiece units 7 mounted on the belt conveyor 15 are automatically or manually carried out of the section E.

Consequently, the system in the second embodiment can produce the same functions and effects as those produced in the above-described first embodiment. Additionally, since the tooth surface grinding before the shot peening can be taken into one of the same system so as to be performed sequentially, gears of high quality can be produced more efficiently.

Third Embodiment

FIG. 3 is a plan view showing the schematic configuration of a gear machining system as a third preferred embodiment of a processing system for increasing the quality of gears according to the present invention. The system in this embodiment comprises, in addition to one or a plurality of systems (one in the illustration) having the same configuration as that of the first embodiment, a plurality (eight in the illustration) of NC (numerical control) gear grinders 12; a belt conveyor 16 for connecting the gear grinders 12 to a shot peening apparatus 1; a gear machining system control chamber 17 having a conventional computer for controlling operation of the entire system for performing processing with respect to precedence instructions or interruption of gear machining in order to enhance productivity; a gear attaching site 18 in which gears 5 are attached to a jig 6 (FIG. 1A) thereby constituting a workpiece unit 7 (FIGS. 1A and 1B); a gear detaching site 19 in which the gears 5 are detached from the jig 6; and a plurality of industrial robots 20, for example, polar coordinates robots for feeding the workpiece units 7.

In the system in the third embodiment, the processes of tooth surface grinding, shot peening and barreling can be performed sequentially with respect to each of the workpiece units 7, and the processes can be controlled by the computer. Consequently, the conditions (a machining time, a machining condition, a position and the like) of the processes can be set arbitrarily, so that the progress, an excessive loads, a machining error, service interruption or the like during the processes can be monitored. The attachment or detachment of the gears 5 to or from the jigs 6 can be performed automatically by the use of the industrial robots 20.

Fourth Embodiment

Figure 4A:
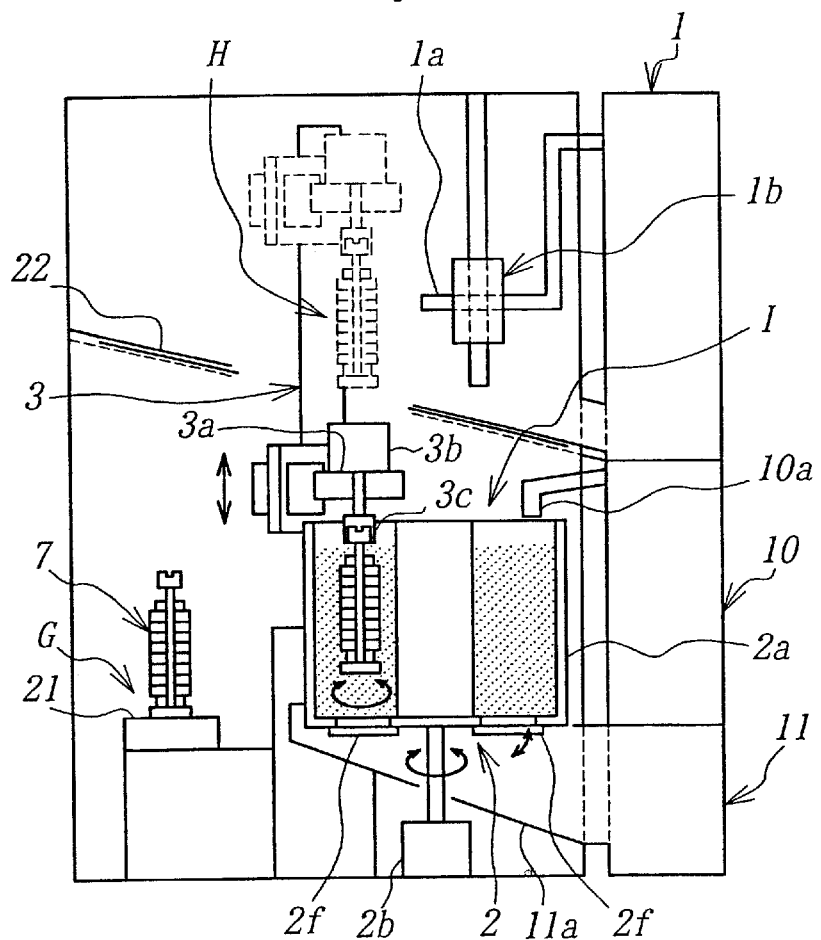
FIG. 4A is a vertical cross-sectional view showing the schematic configuration of a fourth preferred embodiment of a processing system for increasing the quality of a gear according to the present invention.
Figure 4B:
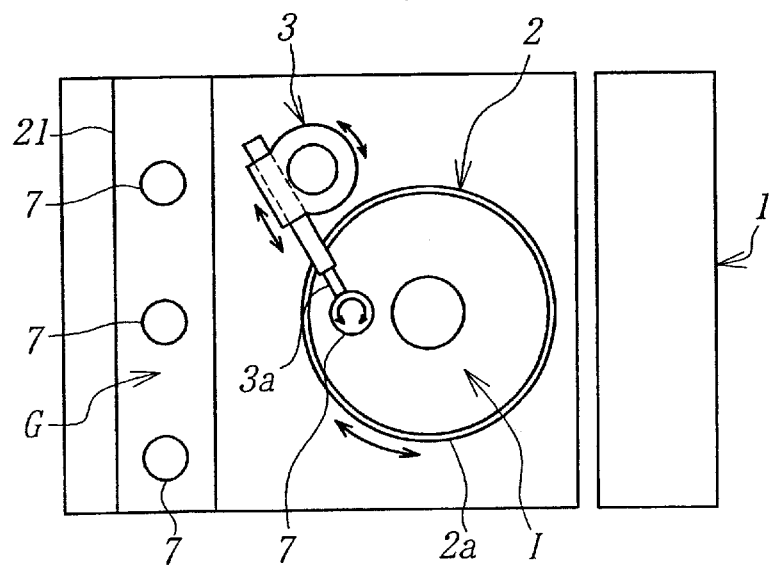
FIG. 4B is a plan view showing the schematic configuration of the system of the fourth preferred embodiment.

FIG. 4A is a vertical cross-sectional view showing the schematic configuration of a fourth preferred embodiment of a processing system for increasing the quality of gears according to the present invention; and FIG. 4B is a plan view showing the schematic configuration of the system of the fourth preferred embodiment. The system in the fourth embodiment comprises: a shot peening apparatus 1; a gyro type barrel polishing apparatus 2 installed vertically adjacently to the shot peening apparatus 1; and a polar coordinates industrial robot 3 as a gear feeding apparatus installed between and adjacently to the shot peening apparatus 1 and the barrel polishing apparatus 2.

The system in the fourth embodiment includes three sections G, H and I in the vicinity of the robot 3. Here, a belt conveyor 21 is installed in the section G. In the section H, a shot nozzle 1a and a nozzle moving mechanism 1b for elevating, descending, advancing, retreating, swinging and oscillating the shot nozzle 1a of the shot peening apparatus 1 are disposed in the same manner as in the section B in the above-described first embodiment. In the section I, a barrel tank 2a of the barrel polishing apparatus 2 is disposed in the same manner as in the section D in the above-described first embodiment.

Unlike the barrel polishing apparatus 2 in the first embodiment, the barrel polishing apparatus 2 in this embodiment is not provided with any motor 2c for rotating a workpiece unit 7, any chuck 2d for detachably connecting a workpiece unit 7 to a motor 2c and any workpiece elevating/descending mechanism 2e for elevating/descending a workpiece unit 7. Instead, the robot 3 in this embodiment comprises, at the tip of an arm 3a, a motor 3b for rotating a workpiece unit 7 and a chuck 3c for detachably connecting the workpiece unit 7 to the motor 3b. Furthermore, in this embodiment, opening/closing type shields 22 are provided for partitioning the sections G and I from the section H.

In the system in this embodiment, shot peening and barrel polishing are performed while the workpiece unit 7 is maintained at the tip of the arm 3a of the robot 3, as described below:

(a) First, the belt conveyor 21 in the section G carries each workpiece unit 7 to a predetermined position, and then, the robot 3 clamps a workpiece unit 7 placed on the belt conveyor 21 by the chuck 3c disposed at the tip of the arm 3a thereof, to move it to the section H.

(2) Subsequently, as the robot 3 rotates the workpiece unit 7 via the motor 3b, the shot peening apparatus 1 moves the shot nozzle 1a, thereby subjecting the gears of the workpiece unit 7 to shot peening.

(3) Upon completion of the shot peening, the shield 22 between the sections H and I is opened, so that the robot 3 descends the workpiece unit 7 down to the barrel tank 2a of the barrel polishing apparatus 2 positioned under the shot peening apparatus 1.

(4) Next, in the same manner as the first embodiment, the barrel polishing apparatus 2 performs rough barrel polishing and finishing barrel polishing in sequence.

(5) Upon completion of the barrel polishing, the robot 3 pulls the workpiece unit 7 up to the section H, where high-pressure air is blown to the workpiece unit 7 through a not-shown nozzle, thereby cleaning the workpiece unit 7. A corrosion inhibitor is atomized to the workpiece unit 7, as required.

(6) Thereafter, the robot 3 returns the workpiece unit 7 to the section G and places it on the belt conveyor 21, which then carries away the workpiece unit 7.

Consequently, the system in the present embodiment can produce the same functions and effects as those produced in the above-described first embodiment. Additionally, since the shot peening apparatus 1 and the barrel polishing apparatus 2 are positioned vertically with respect to each other, the floor area occupied by the system can be reduced, thus enhancing the space efficiency of the gear production site. In particular, the system in the present embodiment can be readily incorporated into a gear machining line now in service, thus increasing the quality of the gear with ease.

While the present invention has been described and illustrated with respect to the specific embodiments, it is to be understood that the present invention is not restricted to the specific embodiments and various modifications and alterations may be made without departing from the spirit and the scope of the invention.

For example, the gear grinder may not be of the NC type, and the gear feeding apparatus may have configuration other than the polar coordinates robot. Furthermore, although in the above-described embodiments the workpiece unit 7 is moved and the gears are subjected to shot peening and barreling in the state in which the workpiece unit 7 is arranged vertically (i.e., in the attitude in which the center axis of the gear extends vertically), the workpiece units 7 in lateral arrangement may be subjected to sequential processes.

Moreover, although in the above-described embodiment the two kinds of roughing and finishing medium are used, two kinds of a fine portion barreling medium capable of entering a fine portion of a workpiece and a peripheral portion barreling medium larger than the fine portion barreling medium may be used, or multiple kinds of media in appropriate combination of the media for barreling the fine and peripheral portions may be selectively used in sequence.

The system according to the present invention can be used to increase the quality of each of gears such as an internal gear, a bevel gear, a hypoid gear and the like in addition to a normal external gear. Furthermore, the system according to the present invention can be applied to gears made of steel, which have been subjected to various kinds of surface hardening such as carburizing, carbo-nitriding, nitriding, sulfur-nitriding, induction hardening and flame hardening, wherein the gears may be cold working or hot working products by rolling, forging or the like, as described above.

Additionally, the system and the barreling apparatus according to the present invention can be applied to processing of mechanical components, for example, a cam, a pin, a bolt or a traction element of a traction drive, which has been subjected to surface hardening.

What is claimed is:

1. A processing system for increasing the quality of one or more surface-hardened gears comprising:
   a workpiece unit including
      a vertically extending jig; and
      one or more gears detachably mounted thereon;
   a shot peening apparatus including
      a rotatable table for detachably supporting said workpiece unit; and
      means for shot peening the gears mounted on said jig as the workpiece unit is rotated by said rotatable table;
   a gear feeding apparatus positioned adjacent said shot peening apparatus, said gear feeding apparatus being detachably connected to said workpiece unit for movement thereof; and
   a barreling apparatus positioned adjacent said shot peening apparatus and said gear feeding apparatus, said barreling apparatus being of a gyro type having a revolving barrel tank, the workpiece being moved to and detachably mounted vertically within said tank by said gear feeding apparatus after shot peening of the gears has been completed; and means for rotating said workpiece within said revolving barrel tank, the gears being subjected to barreling by media introduced into said tank.

2. The processing system as claimed in claim 1, wherein said gear feeding apparatus further feeds said workpiece unit to said shot peening apparatus, and removes said workpiece unit from said barreling apparatus.

3. The processing system as claimed in claim 1, wherein said shot peening apparatus and said barreling apparatus are positioned laterally with respect to each other.

4. The processing system as claimed in claim 1, wherein said shot peening apparatus and said barreling apparatus are positioned vertically with respect to each other.

5. The processing system as claimed in claim 1, which further comprises a grinding apparatus positioned adjacent said shot peening apparatus, said grinding apparatus including
another rotatable table for detachably supporting said workpiece unit; and
means for grinding tooth surfaces of the gears mounted on said workpiece unit; and another gear feeding apparatus positioned adjacent said grinding apparatus and said shot peening apparatus, said another gear feeding apparatus feeding the workpiece unit to said shot peening apparatus after the gears have been ground by said grinding apparatus.

6. The processing system as claimed in claim 1, wherein said barreling apparatus further comprises:

supplying means for supplying sequentially a plurality of kinds of media to said barrel tank; and discharging means for discharging said media from said barrel tank after the gears have been subjected to barreling.

7. A processing system as claimed in claim 1 wherein said barrel tank rotates in a first direction and said workpiece rotates in the opposite direction.

8. The processing system as claimed in claim 2, wherein said barreling apparatus further comprises:

supplying means for supplying sequentially a plurality of kinds of media to said barrel tank; and discharging means for discharging said media from said barrel tank after the gears have been subjected to barreling.

9. The processing system as claimed in claim 3, wherein said barreling apparatus further comprises:

supplying means for supplying sequentially a plurality of kinds of media to said barrel tank; and discharging means for discharging said media from said barrel tank after the gears has been subjected to barreling.

10. The processing system as claimed in claim 4, wherein said barreling apparatus further comprises:

supplying means for supplying sequentially a plurality of kinds of media to said barrel tank; and discharging means for discharging said media from said barrel tank after the gears has been subjected to barreling.

11. The processing system as claimed in claim 5, wherein said barreling apparatus further comprises:

supplying means for supplying sequentially a plurality of kinds of media to said barrel tank; and discharging means for discharging said media from said barrel tank after the gears has been subjected to barreling.

12. A barreling apparatus of a gyro type for barreling a plurality of surface-hardened gears comprising:

a revolving barrel tank for receiving therein a workpiece, said workpiece including a vertically extending jig and one or more gears detachably mounted thereon;

means for rotating said workpiece;

supplying means for supplying sequentially a plurality of kinds of media to said barrel tank; and discharging means for discharging said media from said barrel tank after the gears have been subjected to barreling.

13. The barreling apparatus as claimed in claim 12 wherein said plurality of kinds of media constitute a roughing medium and a finishing medium, said finishing medium having an abrasive grain finer than a grain of said roughing medium.

14. The barreling apparatus as claimed in claim 12 wherein said plurality of kinds of media constitute a fine grain portion barreling medium capable of entering fine portions of the gears, and a peripheral portion barreling medium having grains larger than said fine grain portion barreling medium.

15. A barreling apparatus as claimed in claim 12 wherein said barrel tank rotates in a first direction and said workpiece rotates in the opposite direction.

16. The method of increasing the quality of a plurality of surface-hardened gear, comprising the steps of:

(a) detachably stacking the gears on a jig for support and rotation about a vertical axis of said jig, said jig and detachably stacked gears thereon constituting a workpiece;

(b) moving said workpiece to a shot peening apparatus;

(c) rotating said workpiece about said vertical axis;

(d) shot peening the gears as the workpiece is rotated about said vertical axis;

(e) moving said workpiece from said shot peening apparatus to a barreling apparatus having a barrel tank;

(f) placing said workpiece within said barrel tank;

(g) supplying a roughing medium to said barrel tank;

(h) revolving said barrel tank and rotating said workpiece about said vertical axis, whereby the gears are rough polished;

(i) discharging said roughing medium from said barrel tank after the gears have been subjected to barreling;

j) supplying a fine medium to said barrel tank;

(k) revolving said barrel tank, and rotating said workpiece about said vertical axis in the opposite direction, whereby said gears are fine polished.

17. The method claimed in claim 16 of increasing the quality of a plurality of surface-hardened gear, said method further comprising a step interposed between steps (a) and (b) of conveying said workpiece to a gear grinder.

* * * * *